(No Model.) 2 Sheets—Sheet 1.

D. H. CHURCH.
LATHE FOR TURNING PINION SHAFTS.

No. 432,791. Patented July 22, 1890.

WITNESSES:

INVENTOR
D. H. Church
BY
ATTORNEYS (No Model.) 2 Sheets—Sheet 2.
D. H. CHURCH.
LATHE FOR TURNING PINION SHAFTS.
No. 432,791. Patented July 22, 1890.
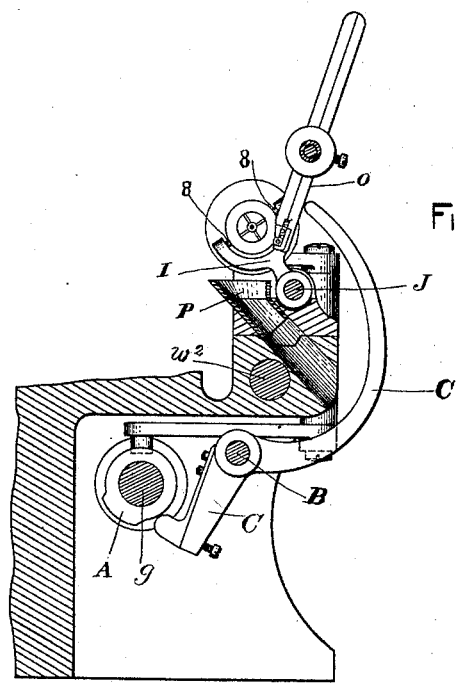
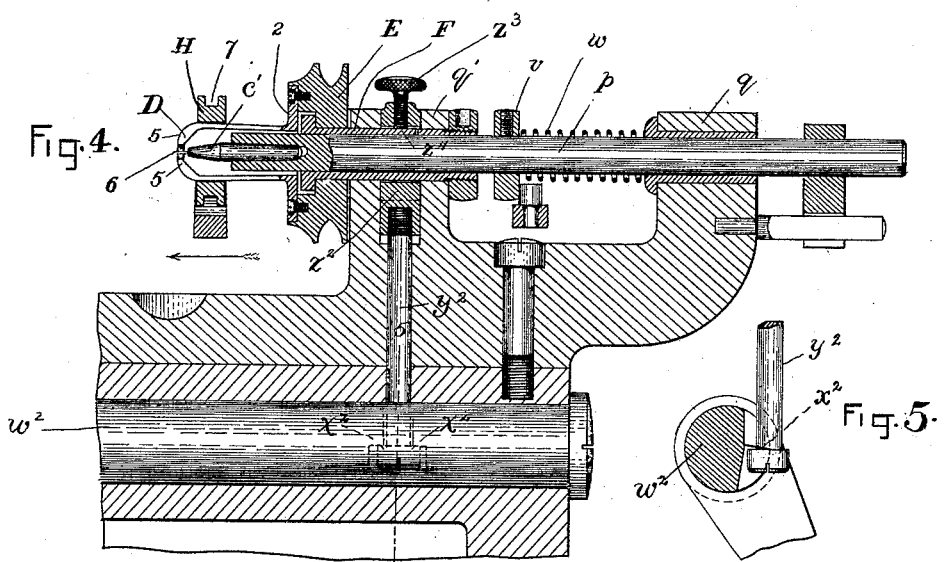
WITNESSES:
INVENTOR
D. H. Church
BY
ATTORNEYS

UNITED STATES PATENT OFFICE.

DUANE H. CHURCH, OF WALTHAM, MASSACHUSETTS.

LATHE FOR TURNING PINION-SHAFTS.

SPECIFICATION forming part of Letters Patent No. 432,791, dated July 22, 1890.

Application filed February 24, 1890. Serial No. 341,581. (No model.)

*To all whom it may concern:*

Be it known that I, DUANE H. CHURCH, of Waltham, in the county of Middlesex and State of Massachusetts, have invented certain new and useful Improvements in the Method of and Means for Engaging Blanks with a Driver for Rotating the Same, of which the following is a specification.

This invention relates to machines adapted to receive metal blanks—such as arbors, staffs, pinions of watches, clocks, and other mechanisms—and reduce said blanks by a turning operation, in which the blanks are fed to the machine one at a time, and each positively rotated while a turning-tool is presented to and moved along its periphery, the blank being supported at its ends by dead-centers, one or both of said centers being movable longitudinally, so that the blank can be admitted between the centers while the latter are separated to their maximum extent, and engaged with the centers after its admission therebetween by an endwise movement of either or both centers.

Heretofore it has been customary to clamp or secure a dog to each blank by hand before inserting it in the machine, the dog being formed to be engaged with a rotating part of the machine after the blank has been engaged with the centers, and to impart rotary movement from such part of the machine to the blank. Heretofore the dog employed has been a separate part, requiring to be applied to and removed from each blank by hand, and constructed to serve as an arm projecting from the blank to which it is attached into the path of a projection on a rotating driver, said projection by its contact with the dog imparting a rotary motion to the blank.

My invention has for its object to render the operations of supplying the blanks to the machine and of dogging or rotatively engaging them with the machine entirely automatic and to this end it consists in a machine of the class above mentioned, having a dog or chuck forming a part of said machine and supported by the frame thereof, said dog being arranged to grasp a blank at a point between the centers, so that the dog may be automatically engaged with a blank after its insertion between the centers, as I will now proceed to describe and claim.

Figure 1:
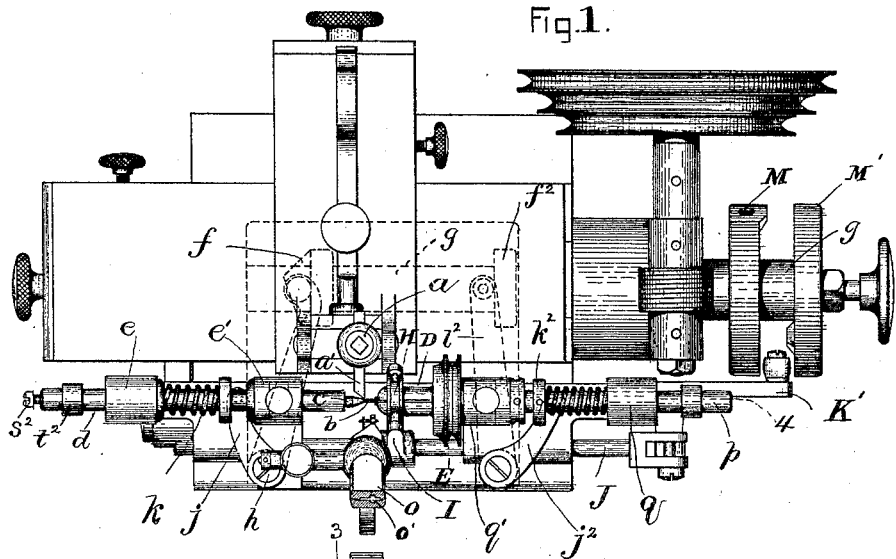
Figure 2:
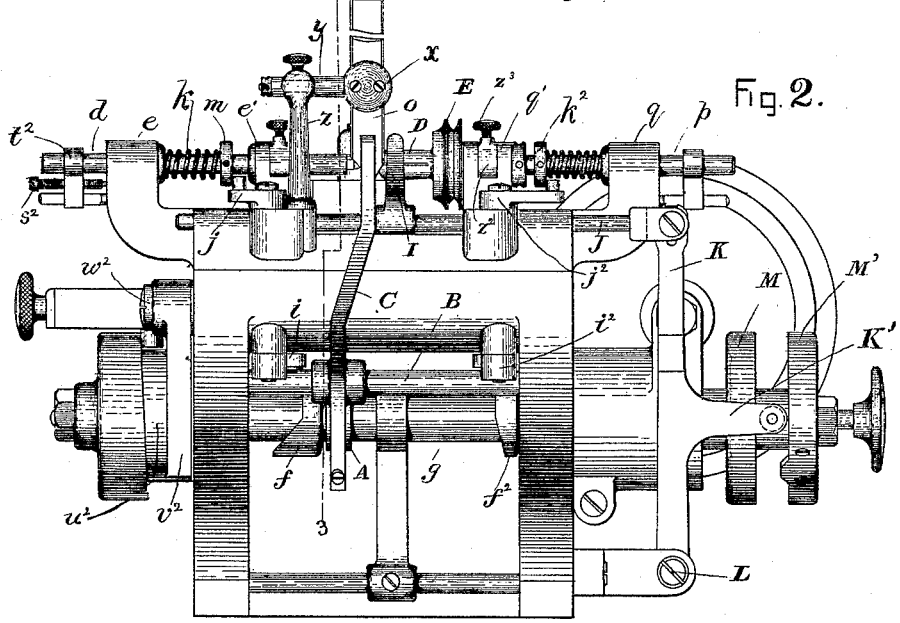

Of the accompanying drawings, forming a part of this specification, Figure 1 represents a top plan view of a machine, technically called a "staff-lathe," constructed in accordance with my invention. Fig. 2 represents a front elevation of the same. Fig. 3 represents a transverse section on line 3 3, Fig. 2, looking toward the right, parts of the machine shown in Fig. 2 being omitted in Fig. 3. Fig. 4 represents an enlarged section on line 4 4, Fig. 1. Fig. 5 represents a section on line 5 5, Fig. 4.

The same letters of reference indicate the same parts in all the figures.

In carrying out my invention I provide a machine of any suitable construction, having a slide-rest or carriage $a$ for a turning-tool $a'$, which is given a progressive movement lengthwise of the blank $b$ by mechanism provided for that purpose, and centers $c$ $c'$, arranged to engage and support the ends of the blank and permit the rotation of the latter in the proper axial position. The centers $c$ and $c'$ are affixed to spindles $d$ and $p$, which are movable endwise in guides or bearings $e$ $e'$ and $q$ $q'$ on the frame of the machine, and are movable toward and away from each other to engage and release the blank. The means here shown for moving the center $c$ are cams $f$ on a shaft $g$, which is rotated by the power of the machine, a rock-shaft $h$, having at one end an arm $i$, bearing on the cam $f$, and at the other end an arm $j$, bearing on a collar $m$ on the spindle $d$, and a spring $k$ on the spindle, interposed between the collar $m$ and the bearing $e$, the cam $f$ acting through the rock-shaft, and its arm retracts the center $c$ to release a blank after action thereon, and the spring $k$ forces the center $c$ forward when permitted by the cam, and causes it to engage one end of the lowest blank in a chute $o$, which presents the blanks to the machine, and moves said blank endwise until its other end is engaged with the other center $c'$. The latter center is here shown as attached to a spindle $p$, which is movable endwise in guides or bearings $q$ $q'$, and is adapted to yield by the movement of said spindle in its bearings, the rod being provided with a collar $v$, which receives the pressure of a spring $w$, interposed between said collar and the bearing $q$.

The springs on the spindles $d$ and $p$ are arranged to act in opposition to each other, and the spring on spindle $p$ must be sufficiently less in tension than the one on spindle $d$ to allow the latter to control the action when connected by the blank between the centers. It is necessary that the endwise movement of the spindles should be stopped in some positive way after the blank has been carried into the chuck, in order to present each successive blank to the turning-tool in the same position. This is accomplished by means of the screw $s^2$, passing through the guide $t^2$ on the spindle $d$, said screw coming in contact with end of bearing $e$. The same result may be produced by means of a cam $f^2$ on shaft $g$, an arm $i^2$ bearing on said cam and attached to the lower end of a vertical rock-shaft, and an arm $j^2$ on the upper end of said rock-shaft and bearing on a collar $k^2$ on the spindle $p$. Either of these devices may be used accordingly as it is desired to positively arrest one center or the other. When the screw $s^2$ is used, the cam $f^2$ and arms $i^2 j^2$ are made inoperative by adjusting said cam so that it will not act on the arm $i^2$, said cam being detachably secured to the shaft $g$. When the cam $f^2$ and the accompanying devices are used, the screw $s^2$ is retracted until it is inoperative.

The chute $o$ passes through a socket or enlargement $x$, formed on a stud $y$, which is mounted to rotate in a bearing in a fixed post or standard $z$, attached to the frame of the machine. Said stud serves as a center on which the chute may oscillate, so that its lower end, which delivers the blanks to the centers, may be swung into and out of the line of said center. The chute is provided with a guideway or channel $o'$, Fig. 1, formed to conduct the blanks to the lower end of the chute, where a suitable device is provided to arrest the lowest blank and prevent it from falling out by its own weight, or from being pressed out by the weight of the superincumbent column of blanks in the chute. The chute is moved forward to bring the lowest blank into line with the centers $c\ c'$ by automatic means, a suitable embodiment of which is shown in Figs. 2 and 3, in which A is a cam on the shaft $g$, B a rock-shaft, on which is a lever C, one arm of which bears on the cam A and the other arm against the lower portion of the chute $o$.

The cam A is formed to impart an oscillatory movement to the lever C, thereby causing said lever to oscillate the chute $o$, the described mechanism being timed to swing the lower end of the chute into line with the centers just before the forward movement of the center $c$, so that said center comes in contact with one end of the lowest blank in the chute and forces said blank endwise until its opposite end is engaged with the center $c'$, the latter yielding more or less as may be required by the length of the blank and the extent of the forward movement of the center $c$.

D represents a dog or chuck, which is here shown as composed of a tube having at one end a flange 2, which is affixed by screws to a whirl E, mounted to rotate loosely on a fixed sleeve F, which is attached to the bearing $q'$, as clearly shown in Fig. 4. The outer end of the tube is contracted to form jaws 5 5, which are separated from each other by longitudinal slits or cuts made in the tubular body of the dog. This dog is formed in Fig. 4 to inclose the center $c'$, the opening 6, surrounded by the outer ends of the jaws 5, being in close proximity to and coinciding with the blank-receiving end of the center $c'$, so that each blank when moved endwise by the center $c$, as above described, passes through the opening between the ends of the jaws of the dog or chuck and is surrounded by said jaws when it is engaged with the center $c'$.

H represents a ring which incloses the dog D, and is adapted, when moved in the direction indicated by the arrow in Fig. 4, to bear upon the outer surfaces of the jaws of the dog and compress said jaws upon the blank, the outer surfaces of the jaws being tapered, so that the tubular portion on which said jaws are formed increases in diameter from the flange 2 outwardly to such an extent that the described movement of the ring H will compress the jaws in the manner described. The ring H has a peripheral groove 7, which receives studs 8 8, projecting inwardly from bifurcations on an arm I, which is rigidly attached to a rod J, adapted to move endwise in bearings in the frame of the machine. One end of the rod J is connected with the swinging end of the lever K, the other end of which is pivoted at L to a fixed ear or bracket on the frame of the machine. The lever K is provided with an arm or extension K', having a trundle-roll which enters a space between two cams M M', which are attached to the shaft $g$. The cams M M' are formed to give an endwise motion to the rod J through the lever K, first in one direction and then in the opposite direction, one of said movements causing the ring H to move in the direction indicated by the arrow in Fig. 4, and thus close the jaws of the dog D upon the blank, while the other movement causes said ring to release the jaws and permit them to spring open and release the blank.

The whirl E is connected by belt or otherwise to a driving-shaft, from which it derives rotary motion, and must be fitted loosely enough on its bearing to permit the dog or chuck to follow the blank without strain on the points which are engaged with the centers $c$ and $c'$. It is also probable that for very small diameters of work it would be preferable to separate the dog or chuck from the pulley, rotating the dog or chuck by means of a pin and slot, and thus release the chuck from the vibration of the belt. It will be seen, therefore, that when the ring H is moved to compress the jaws of the dog or chuck upon the blank the latter will be rotatively engaged with the whirl E and will be rotated thereby. When the ring H is moved in the direction opposite to that indicated by the arrow in Fig. 4, the blank is of course released by the dog and the center $c$ is immediately after retracted, so that the blank, no longer supported by the centers, drops and passes out of the machine through a suitable spout P. (See Fig. 3.)

During the action of the turning-tool on the blank it is necessary that the spindles $d$ and $p$ be held firmly, so that the blank cannot become loosened between the centers by endwise yielding movements of the centers. The means here shown for effecting this holding action (technically known as "binding") are a cam $w^2$ on the shaft $g$, a lever $v^2$, bearing on said cam, a rock-shaft $w^2$, journaled in the supporting-frame and having a recess on which are formed shoulders $x^2$ $x^2$, which bear on the head of a stud $y^2$, one end of which is attached to a collar $z^2$, which surrounds the bearing F, and has a screw $z^3$, which bears on a tongue $z^4$, formed by cutting into said bearing. When the rock-shaft $w^2$ is turned to cause its shoulders $x^2$ to depress the stud $y^2$ and collar $z^2$, the screw $z^3$ forces the tongue $z^4$ downwardly on the spindle $p$, and thereby binds or clamps the spindle $p$. Similar devices may be employed to bind or clamp the spindle $d$.

It will be seen that by dogging the work after its insertion between the centers I am enabled to make the entire operation of the machine automatic, thus greatly increasing the rapidity of its operation and decreasing the expense thereof.

My invention is not limited to the construction of the dogging device here shown, and I may variously modify the same without departing from the nature of my invention.

I claim—

1. In an organized machine for turning blanks, a dog or chuck forming a part of said machine and arranged to grasp a blank at a point between the centers on which the blank is rotated, whereby the blank may be automatically dogged after its insertion between said centers, as set forth.

2. The combination, with centers adapted to support a blank in suitable relation to a turning-tool, of a whirl rotatable independently of said center, a dog or chuck rotatively engaged with said whirl, and means for engaging the dog with the blank engaged with said centers, as set forth.

3. The combination of a movable chute or reservoir adapted to contain a series of blanks, centers arranged to receive the lowest blank in said chute when the latter is in its delivering position, an independent rotatable whirl, a dog or chuck permanently connected with said whirl, and means for compressing said dog upon the blank engaged with said centers, as set forth.

4. The combination, with centers adapted to engage the ends of a pinion-blank, of an independently-rotatable whirl, a dog or chuck attached to said whirl and having jaws arranged to act on a blank at a point between said centers, and means for compressing and releasing said jaws to alternately hold and release a blank, as set forth.

5. The combination of the centers adapted to engage the ends of a blank, an independently-rotatable whirl, a dog or chuck attached to said whirl and having jaws arranged to act on a blank at a point between said centers, a ring surrounding said dog or chuck, and automatic means for moving said ring alternately in opposite directions to alternately grasp and release the blank, as set forth.

In testimony whereof I have signed my name to this specification, in the presence of two subscribing witnesses, this 12th day of February, A. D. 1890.

DUANE H. CHURCH.

Witnesses:
C. F. BROWN,
A. D. HARRISON.